(12) United States Patent
Cho

(10) Patent No.: US 7,474,542 B2
(45) Date of Patent: Jan. 6, 2009

(54) HIGH VOLTAGE POWER SUPPLY

(75) Inventor: Jong-hwa Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 11/121,003

(22) Filed: May 4, 2005

(65) Prior Publication Data
US 2005/0259452 A1 Nov. 24, 2005

(30) Foreign Application Priority Data
May 4, 2004 (KR) .................. 10-2004-0031329

(51) Int. Cl.
*H02M 3/335* (2006.01)
(52) U.S. Cl. ........................................... 363/16
(58) Field of Classification Search ............... 323/282; 363/16–26, 78, 95, 97, 98
See application file for complete search history.

(56) References Cited
U.S. PATENT DOCUMENTS
5,675,485 A * 10/1997 Seong ........................ 363/97

| 6,064,124 A | 5/2000 | Inukai | 307/43 |
| 6,369,558 B2 * | 4/2002 | Umemoto | 323/282 |
| 6,940,261 B1 * | 9/2005 | Umminger | 323/282 |

FOREIGN PATENT DOCUMENTS
| JP | 59-056865 | 4/1984 |
| JP | 10-129030 | 5/1998 |
| KR | 1999-0029547 | 7/1999 |

* cited by examiner

*Primary Examiner*—Shawn Riley
(74) *Attorney, Agent, or Firm*—Roylance, Abrams, Berdo & Goodman, LLP

(57) ABSTRACT

A high voltage power supply for use in a laser printer, multi-function peripheral, or similar device, wherein the high voltage power supply includes a pulse width modulation (PWM) input unit, a high voltage output unit, and a delaying feedback unit for preventing the generation of an abnormally high voltage in an output signal of the high voltage output unit. By delaying the time when an offset voltage is supplied to the output signal, the generation of an abnormally high voltage that is applied to a surface of a photoconductive drum when a printer is turned on and which can deteriorate the quality of printed images can be prevented.

10 Claims, 6 Drawing Sheets

HIGH VOLTAGE POWER SUPPLY

CROSS-REFERENCE TO RELATED PATENT APPLICATIONS

This application claims the benefit under 35 U.S.C. § 119(a) of Korean Patent Application No. 10-2004-0031329, filed in the Korean Intellectual Property Office on May 4, 2004, the entire disclosure of which is hereby incorporated by reference.

BACKGROUND OF THE INVENTION

1. Field of the Invention

The present invention relates to a high voltage power supply used in a laser printer or a multifunction peripheral. More particularly, the present invention relates to a high voltage power supply that is capable of preventing the generation of an abnormally high voltage, which can deteriorate image quality when applied to a surface of a photoconductive drum.

2. Description of the Related Art

In a multifunction peripheral having a printing function such as a laser printer, a laser beam is radiated onto an electrostatically charged photoconductive drum to produce latent characters or images to be printed on a sheet of paper. The latent characters or images are developed onto printing paper using toner. The developed characters or images are fixed onto printing paper by a fixing process. The multifunction peripheral or laser printer requires a high voltage to achieve the above-described functions. To this end, the multifunction peripheral or laser printer includes a high voltage power supply.

FIG. 1 is a block diagram of a conventional high voltage power supply. The high voltage power supply in FIG. 1 includes a pulse width modulation (PWM) signal input unit 100, a switching drive control unit 110, a switching unit 120, a boosting and rectifying unit 130, an offset voltage supplying unit 140, and a voltage branching unit 150. The PWM signal input unit 100 receives an enable signal IN1 from a central processing unit (CPU, not shown), which is indicative of whether to output a high voltage. The switching drive control unit 110 outputs a switching drive control signal by comparing a reference signal, which is the enable signal IN1 via the PWM signal input unit 100, with an output signal. The switching unit 120 then generates a voltage for a primary coil of a fly-back transformer (FBT) in the boosting and rectifying unit 130 according to the switching drive control signal. The fly-back transformer (not shown) of the boosting and rectifying unit 130 boosts the voltage generated at the primary coil (not shown) and outputs the boosted voltage to an output terminal of a secondary coil (not shown). Further, the boosting and rectifying unit 130 rectifies the boosted voltage and outputs an output signal OUT1. The offset voltage supplying unit 140 supplies an offset voltage to the output signal OUT1, which is fed back to the switching drive control unit 110 via the voltage branching unit 150. The voltage branching unit 150 branches off the voltage of the output signal to feed it back to the switching drive control unit 110 such that the output signal can be compared with the reference signal.

FIG. 2 is an exemplary circuit diagram of the switching drive control unit 110. The switching drive control unit 110 is configured as a proportional integral (PI) controller and compares a composite signal IN3 (the output signal of the boosting and rectifying unit 130 and the offset voltage supplied from the offset voltage supplying unit 140), with a reference signal IN2 input from the PWM signal input unit 100, and outputs a drive control signal OUT2. That is, the switching drive control unit 110 senses a difference between the composite signal IN3 and the reference signal IN2, and outputs a drive control signal to the switching unit 120 based on the difference. The switching drive control unit 110 increases the voltage level of the output drive control signal if the input reference signal IN2 has a lower level than the composite signal IN3. The switching drive control unit 110 decreases the voltage level of the output drive control signal if the reference signal IN2 has a higher level than the composite signal IN3.

When power is first turned on, a PWM signal transitions from a low logic state to a high logic state, and is maintained in the high logic state in a standby mode. At this time, a high voltage output is not desired. However, since the composite signal IN3 comprises the offset voltage, the offset voltage reaches a non-inverting terminal (+) of an operational amplifier OP1 earlier than the reference signal IN2 input from the PWM signal input unit reaches an inverting terminal (−) of the operational amplifier OP1 when power is turned on. As a result, the output signal of the operational amplifier OP1 has a high initial voltage level just after power is turned on. The waveforms of the two input signals and the output signal of the operational amplifier OP1 when power is turned on are illustrated in FIG. 3. As illustrated in FIG. 3, the offset voltage is rapidly applied from the offset voltage supplying unit 140 to the non-inverting terminal (+) of the operational amplifier OP1 such that an output signal OUT1 having an undesirably high voltage level is output. However, when an abnormally high voltage signal is applied to a surface of the photoconductive drum when power is turned on, the quality of the desired images deteriorates and the printing operation becomes unstable.

Accordingly, a need exists for a high voltage power supply and method of use that is capable of preventing the generation and application of an abnormally high voltage to a surface of a photoconductive drum when power is turned on.

SUMMARY OF THE INVENTION

The present invention substantially solves the above and other problems, and provides a high voltage power supply that is capable of preventing the generation of an abnormally high voltage that can deteriorate the quality of images by being applied to a surface of a photoconductive drum when power is turned on.

According to an aspect of the present invention, a high voltage power supply is provided comprising a pulse width modulation (PWM) input unit for receiving a PWM signal, converting the received PWM signal into a DC level, and outputting the converted PWM signal as a reference signal, a high voltage output unit for performing a switching operation by comparing the reference signal with a feedback output signal, boosting and rectifying a voltage according to the switching operation, and outputting an output signal having a high voltage level, and a feedback unit for delaying an offset voltage signal and thereby controlling the time when an offset voltage is supplied to the output signal to be fed back, and for feeding back the delayed offset voltage signal to the high voltage output unit.

The feedback unit preferably comprises an offset voltage signal delay circuit portion for delaying the time when the offset voltage signal is supplied to the output signal to be fed back, and a voltage branching portion for branching off the output signal having the high voltage level for comparison with the reference signal. An exemplary offset voltage signal delay circuit portion is a resistor-capacitor (RC) circuit including a resistor and a capacitor. In the RC circuit, one end of the resistor is connected to an offset voltage source which supplies the offset voltage, and the other end of the resistor is connected to one end of the capacitor. The other end of the capacitor is grounded.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

Figure 1:
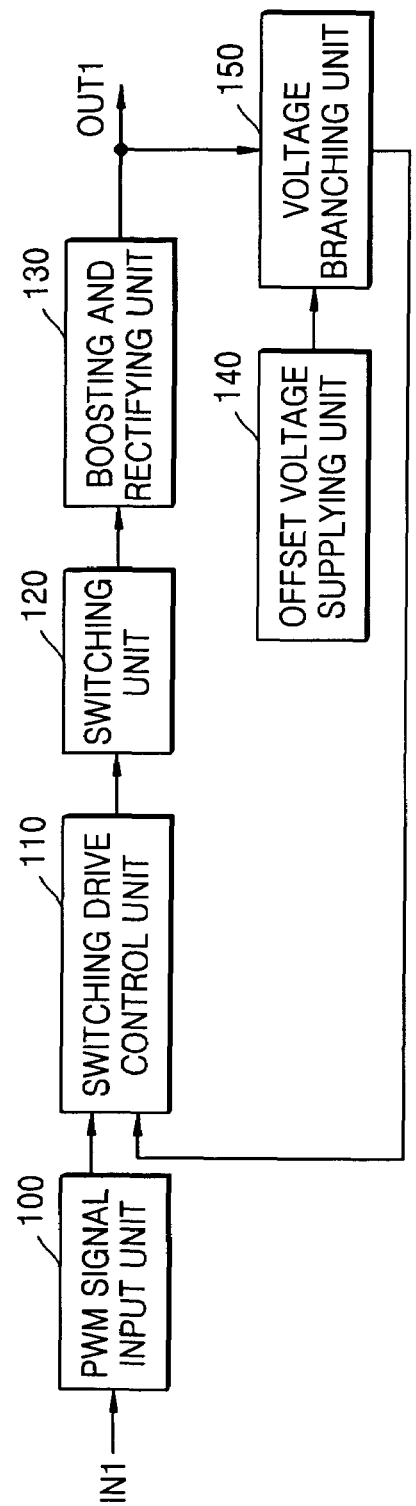
FIG. 1 is a block diagram of a conventional high voltage power supply.
Figure 2:
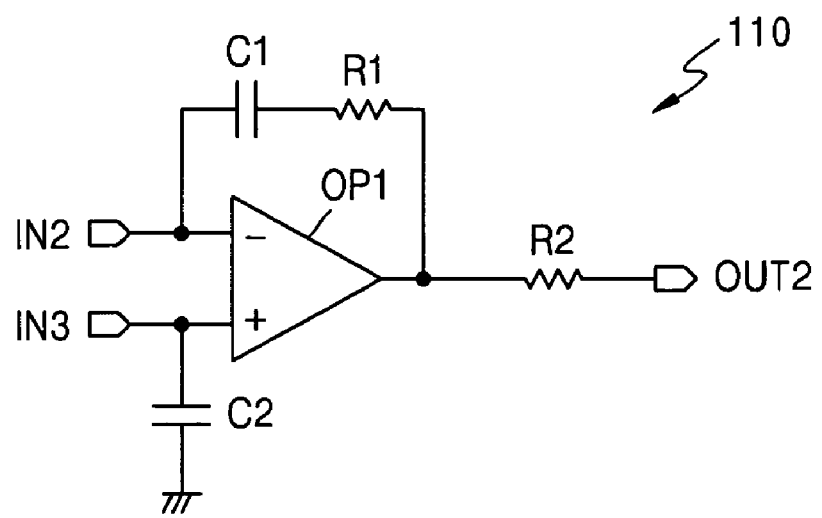
FIG. 2 is an exemplary circuit diagram of a switching drive control unit in the conventional high voltage power supply of FIG. 1.
Figure 3:
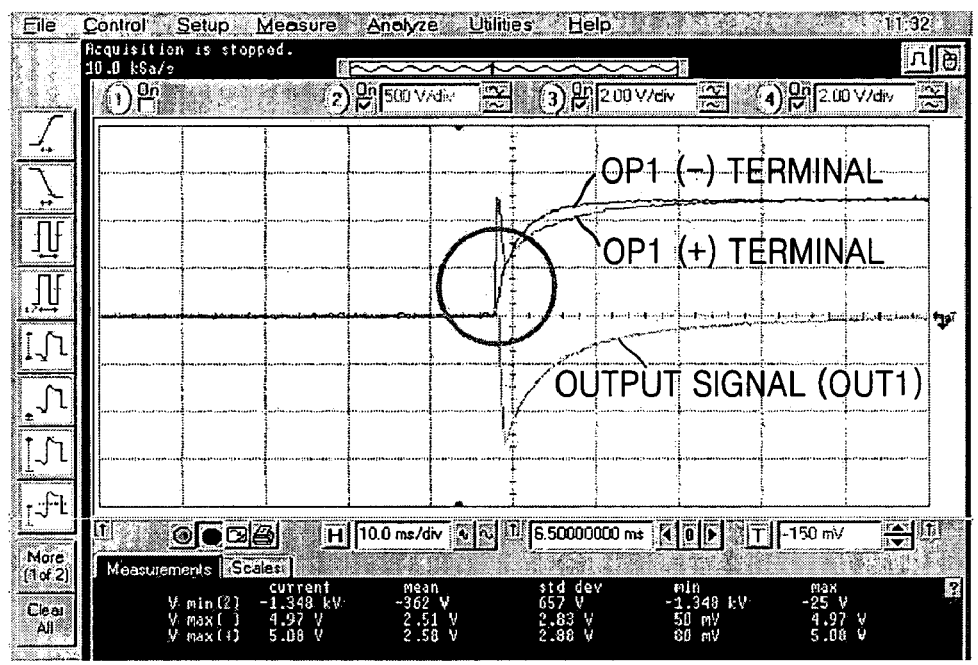
FIG. 3 is a diagram illustrating the waveforms of input signals and a output signal of an operational amplifier in the conventional high voltage power supply of FIG. 1.
Figure 4:
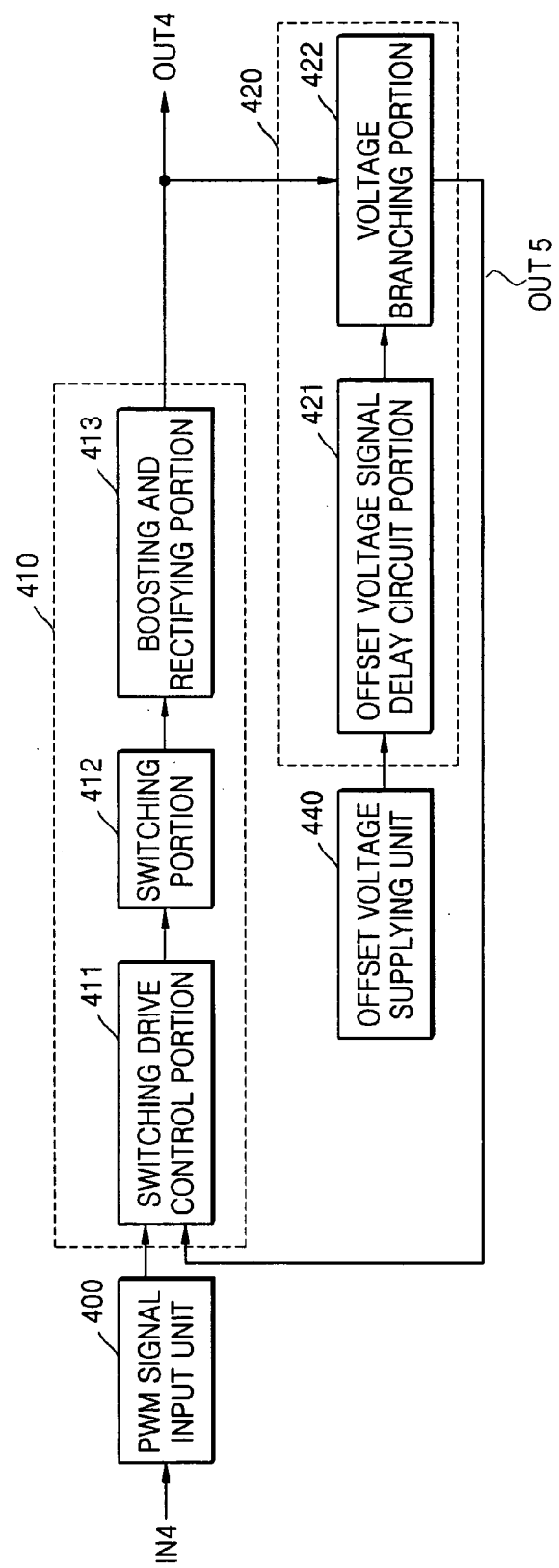
FIG. 4 is a block diagram of a high voltage power supply according to an embodiment of the present invention.
Figure 5:
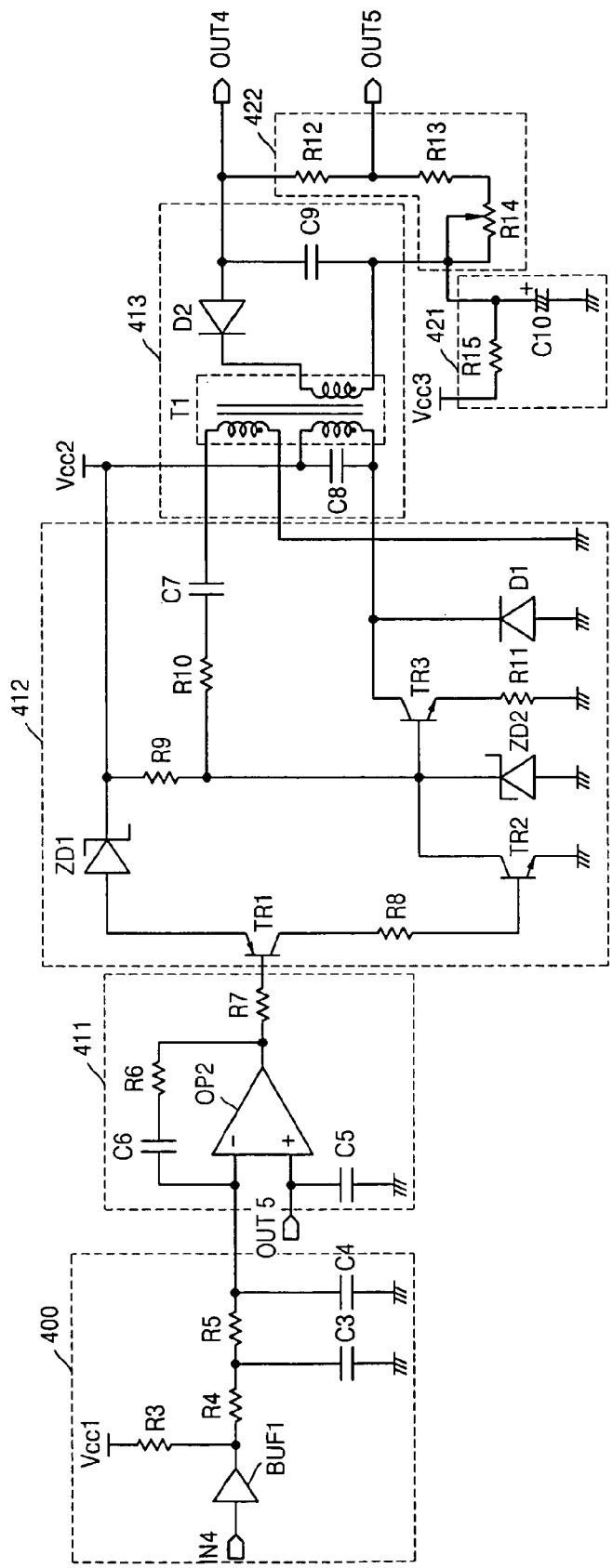
FIG. 5 is a exemplary circuit diagram of a high voltage power supply according to the embodiment of the present invention.

Referring to FIG. 4, a block diagram of a high voltage power supply according to an embodiment of the present invention is shown, wherein the high voltage power supply includes a pulse width modulation (PWM) signal input unit 400, a high voltage output unit 410, a feedback unit 420, and an offset voltage supplying unit 440. The high voltage output unit 410 includes a switching drive control portion 411, a switching portion 412, and a boosting and rectifying portion 413. The feedback unit 420 includes an offset voltage signal delay circuit portion 421, and a voltage branching portion 422. FIG. 5 is an exemplary circuit diagram of the high voltage power supply shown in FIG. 4.

Referring to FIGS. 4 and 5, the PWM signal input unit 400 receives a PWM signal IN4, converts the received PWM signal to a DC (direct current) level, and outputs the converted PWM signal as a reference signal. As used herein, pulse modulation refers to a process for modulating a voice signal or other signal waves into pulses. There are two types of pulse modulation, including continuous level modulation in which the amplitudes, widths, or positions of pulses continuously vary according to the amplitude of a signal wave, and discontinuous level modulation in which the number or positions of unit pulses vary. In particular, pulse width modulation (PWM), which is a kind of continuous level modulation, involves modulating a signal wave by varying the widths of pulses according to the amplitude of the signal wave. The width of pulses increases when the amplitude of the signal wave is great, and the width of pulses decreases when the amplitude of the signal wave is small. However, the positions or amplitude of the pulses do not change. A signal generated by PWM is referred to as a PWM signal. The PWM signal input unit 400 receives the PWM signal under the control of a central processing unit (CPU, not shown). The pulse width of the PWM signal is controlled by the CPU according to environmental conditions.

Referring to FIG. 5, the PWM signal input unit 400 includes a low pass filter (LPF) to convert the input PWM signal into a DC level. A LPF passes only a low frequency signal having a frequency less than or equal to a predetermined level using a resistor R4, a capacitor C3, a resistor R5, and a capacitor C4 in FIG. 5, thereby converting the PWM signal into the DC level. The PWM signal input unit 400 then outputs the converted DC level PWM signal to the switching drive control portion 411 as a reference signal.

The switching drive control portion 411 compares a composite signal OUT5 (the output signal OUT4 supplied from the boosting and rectifying portion 413 and a predetermined voltage Vcc3 supplied from the offset voltage supplying unit 440) that is delayed while passing through the offset voltage signal delay circuit portion 421, with a reference signal input from the PWM signal input unit 400. The switching drive control portion 411 then outputs a drive control signal for driving the switching portion 412. That is, the switching drive control portion 411 senses a difference between the composite signal OUT5 and the reference signal, and outputs a drive control signal to the switching portion 412. The switching drive control portion 411 increases the voltage level of the output drive control signal if the composite signal OUT5 has a higher level than the reference signal, and decreases the voltage level of the output drive control signal if the composite signal OUT5 has a lower level than the reference signal.

The switching portion 412 performs a switching operation in response to the drive control signal input from the switching drive control portion 411 to allow the boosting and rectifying portion 413 to generate a voltage having an adjusted level at a primary coil of the fly-back transformer T1. Upon receipt of the drive control signal, the switching portion 412 performs switching such that a voltage having an adjusted level is generated at the primary coil of the fly-back transformer T1. For example, when a drive control signal having a higher voltage level than the previous drive control signal is input, the switching portion 412 performs switching such that a high voltage oscillates at the primary coil of the fly-back transformer T1. In contrast, when a drive control signal having a lower voltage level than the previous drive control signal is input, the switching portion 412 performs switching such that a low voltage oscillates at the primary coil of the fly-back transformer T1.

In particular, referring to FIG. 5, when the output of an operational amplifier OP2 of the switching drive control portion 411 becomes high, a PNP type transistor TR1 of the switching portion 412 is turned off, a base terminal of an NPN type transistor TR2 of the switching portion 412 goes to a low state, and accordingly, the transistor TR2 is turned off. When the NPN type transistor TR2 is turned off, a base terminal of an NPN type transistor TR3 of the switching portion 412 goes to a high state, and accordingly, the transistor TR3 is turned on. The amount of current $I_c$, which flows through the NPN type transistor TR3, increases over time while passing through the primary coil of the fly-back transformer T1 of the boosting and rectifying portion 413. When the amount of current $I_c$ reaches a current amplification factor $H_{fe}$ of the transistor TR3, the transistor TR3 cannot be maintained in an on-state, and the transistor TR3 turns off. As the transistor TR3 turns off, a counter electromotive force is generated at the primary coil of the fly-back transformer T1 in the boosting and rectifying portion 413 and energy is emitted through a secondary coil of the fly-back transformer T1, thereby generating a load that induces current flow. As a result, an output signal OUT4 is output through a rectifying circuit consisting of a diode D2 and a capacitor C9.

When the output of the operational amplifier OP2 of the switching drive control portion 411 becomes low, the PNP type transistor TR1 of the switching portion 412 is turned on, the base terminal of the NPN type transistor TR2 of the switching portion 412 goes to a high state, and accordingly, the NPN type transistor TR2 is turned on. When the transistor TR2 is turned on, the base terminal of the NPN type transistor TR3 of the switching portion 412 is grounded, the transistor TR3 is turned off, and a high voltage cannot be generated.

The fly-back transformer T1 of the boosting and rectifying unit 413 boosts the voltage that has been level-adjusted by the switching of the switching portion 412 using coils. The boosting and rectifying portion 413 then rectifies and outputs the boosted voltage as the output signal OUT4. The output signal OUT4 is supplied to any number of devices, for example a printer, for printing.

The offset voltage supplying unit 440 and the offset voltage signal delay circuit portion 421, which are located between the boosting and rectifying portion 413 and the voltage branching portion 422, supply a predetermined voltage Vcc3 to the output signal OUT4 to be fed back to the switching drive control portion 411. The voltage branching portion 422 branches off the output signal OUT4 output from the boosting and rectifying portion 413 for comparison with a reference signal. In addition, the voltage branching portion 422 includes a variable resistor R14, which finely adjusts the voltage of the output signal OUT4 to be fed back to the switching drive control portion 411 as the output signal OUT5. The offset voltage signal delay circuit portion 421 delays an offset voltage signal and thereby controls when an offset voltage is applied, and provides the delayed offset voltage signal to a non-inverting terminal of the switching drive control portion 411. When a PWM signal is applied to the PWM signal input unit 400, the composite signal OUT5 (the predetermined voltage Vcc3 of the offset voltage supplying unit 440 and the output signal OUT4 of the boosting and rectifying portion 413) is input to the switching drive control portion 411. However, even when no PWM signal is applied to the PWM signal input unit 400, the predetermined voltage Vcc3 of the offset voltage supplying unit 440 is input to the switching drive control portion 411.

Therefore, in accordance with an embodiment of the present invention, when power is turned on, the offset voltage signal delay circuit portion 421 delays the time when the offset voltage to be input to the switching drive control portion 411 is applied. As illustrated in FIG. 5, the offset voltage signal delay circuit portion 421 includes a resistor R15 and a capacitor C10. The RC circuit, which consists of the resistor R15 and the capacitor C10, delays the time when the offset voltage is applied. The resistor R15 induces a relatively small resistance, for example, a resistance in the range of about ten to several hundred ohms ($\Omega$). In an exemplary embodiment of the present invention, a resistor R15 having a resistance of 100 $\Omega$ was used. The capacitor C10 has a relatively large capacitance, for example, a capacitance of about ten to several hundred microfarads ($\mu F$). In an exemplary embodiment of the present embodiment, a capacitor having a capacitance of 47 $\mu F$ was used. Accordingly, the RC circuit used in the offset voltage signal delay circuit portion 421 of the exemplary embodiment of the present invention shown in FIG. 5 has a time constant of 4.7 $msec^{-1}$. One end of the resistor R15 is connected to the predetermined voltage Vcc3 and the other end thereof is connected to one end of the capacitor C10. The other end of the capacitor C10 is grounded.

Figure 6:
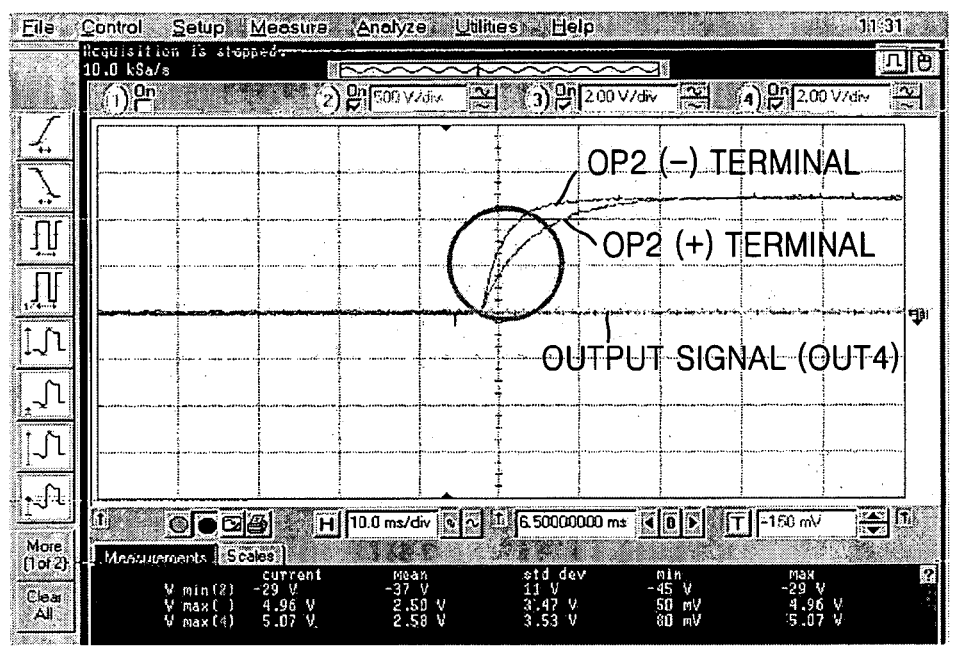
FIG. 6 is a graph illustrating the waveforms of input signals and an output signal of an operational amplifier in the high voltage power supply of FIG. 5.

FIG. 6 illustrates a number of exemplary waveforms of two input signals and an output signal of the operational amplifier in the high voltage power supply according to an embodiment of the present invention. As shown in FIG. 6, as a result of delaying the time when the offset voltage is applied in the offset voltage signal delay circuit portion 421, no abnormally high voltage appears in the waveform of the output signal OUT4.

As described above, in the present invention, the time when the offset voltage is supplied to the output signal to be fed back is delayed using an RC circuit, thereby preventing the generation of an abnormally high voltage that is applied to a surface of a photoconductive drum when a printer is turned on and which can deteriorate the quality of printed images.

While the present invention has been particularly shown and described with reference to exemplary embodiments using specific terminologies, the embodiments and terminologies should be considered in a descriptive sense only and not for the purpose of limitation. Therefore, it will be understood by those skilled in the art that various changes in form and details may be made therein without departing from the spirit and scope of the present invention as defined by the following claims.

What is claimed is:

1. A high voltage power supply comprising:
   a PWM (pulse width modulation) input unit for receiving a PWM signal, converting the received PWM signal into a DC (direct current) level, and outputting the converted PWM signal as a reference signal;
   a high voltage output unit for performing a switching operation by comparing the reference signal with a feedback output signal, boosting and rectifying a voltage according to the switching operation, and outputting an output signal having a high voltage level; and
   a feedback unit for delaying an offset voltage signal and thereby controlling a time when an offset voltage is supplied to the output signal to be fed back, and for feeding back the delayed offset voltage and output signal as the feedback output signal to the high voltage output unit.

2. The high voltage power supply of claim 1, wherein the feedback unit comprises:
   an offset voltage signal delay circuit portion for delaying the time when the offset voltage signal is supplied to the output signal to be fed back; and
   a voltage branching portion for branching off the output signal having the high voltage level for comparison with the reference signal.

3. The high voltage power supply of claim 2, wherein the offset voltage signal delay circuit portion comprises a resistor-capacitor (RC) circuit including a resistor and a capacitor.

4. The high voltage power supply of claim 3, further comprising:
   an offset voltage source, wherein one end of the resistor of the RC circuit is electrically connected to the offset voltage source which supplies the offset voltage, and the other end of the resistor is connected to one end of the capacitor of the RC circuit.

5. The high voltage power supply of claim 3, wherein one end of the capacitor of the RC circuit is electrically connected to one end of the resistor of the RC circuit, and the other end of the capacitor is grounded.

6. The high voltage power supply of claim 2, wherein the voltage branching portion comprises a variable resistor for adjusting a voltage level of the output signal to be fed back.

7. The high voltage power supply of claim 2, wherein the voltage branching portion comprises an input for receiving the delayed offset voltage to be supplied to the output signal to be fed back.

8. The high voltage power supply of claim 3, wherein the resistor comprises a resistance in the range of about ten to several hundred ohms ($\Omega$), and the capacitor comprises a capacitance in the range of about ten to several hundred microfarads ($\mu F$).

9. The high voltage power supply of claim 3, wherein the resistor comprises a resistance of about 100 ohms ($\Omega$), and the capacitor comprises a capacitance of about 47 microfarads ($\mu F$).

10. A method of controlling a high voltage power supply to prevent the generation of an abnormally high voltage when power is turned on, the method comprising the steps of:

receiving a PWM (pulse width modulation) signal, converting the received PWM signal into a DC (direct current) level, and outputting the converted PWM signal as a reference signal;

comparing the reference signal with a feedback output signal, boosting and rectifying a voltage according to the comparison, and outputting an output signal having a high voltage level; and delaying a time when an offset voltage is supplied to the output signal to be fed back, and feeding back the delayed offset voltage and output signal as the feedback output signal for the comparison with the reference signal.

* * * * *